(12) United States Patent
MacNeil et al.

(10) Patent No.: US 8,959,809 B2
(45) Date of Patent: Feb. 24, 2015

(54) LICENSE PLATE FRAME SPACER UNIT AND SYSTEM

(71) Applicant: MacNeil IP LLC, Bolingbrook, IL (US)

(72) Inventors: David F. MacNeil, Hinsdale, IL (US);
David S. Iverson, Hinsdale, IL (US)

(73) Assignee: MacNeil IP LLC, Bolingbrook, IL (US)

( * ) Notice: Subject to any disclaimer, the term of this patent is extended or adjusted under 35 U.S.C. 154(b) by 0 days.

(21) Appl. No.: 14/156,705

(22) Filed: Jan. 16, 2014

(65) Prior Publication Data

US 2014/0133935 A1     May 15, 2014

(51) Int. Cl.
*G09F 7/18*      (2006.01)
*B60R 13/10*     (2006.01)

(52) U.S. Cl.
CPC ............. *B60R 13/105* (2013.01); *G09F 7/18* (2013.01)
USPC ............. 40/209; D20/13; 16/403; 248/300

(58) Field of Classification Search
CPC ......... B60R 13/105; B60R 13/10; G09F 7/18; G09F 21/04; G09F 2007/1895
USPC ........... 40/209, 741, 753, 761, 795, 796, 790; D20/13; 16/403; 248/300; D8/354, D8/353, 349, 371
See application file for complete search history.

(56) References Cited

U.S. PATENT DOCUMENTS

| | | | |
|---|---|---|---|
| 208,681 A * | 10/1878 | Hale | ............................... 40/793 |
| 263,426 A * | 8/1882 | O'Brien | ......................... 403/388 |
| 1,300,743 A | 4/1919 | Lawler | |
| 1,551,533 A * | 9/1925 | Benson | ......................... 248/300 |
| 1,568,907 A | 1/1926 | Mytko | |
| 1,701,419 A | 2/1929 | Peden | |
| 1,787,545 A | 1/1931 | Orester et al. | |
| 1,913,773 A | 6/1933 | Scaplen | |
| 2,361,479 A | 10/1944 | Joffo | |
| 2,603,013 A | 7/1952 | Sherwood | |
| 2,710,475 A | 6/1955 | Salzmann | |
| 2,775,832 A | 1/1957 | Vizza | |
| 2,792,193 A * | 5/1957 | Walsh | ....................... 248/223.41 |
| 2,831,280 A | 4/1958 | McCulley | |
| 2,875,539 A | 3/1959 | Gladd | |
| 2,877,583 A | 3/1959 | Poole | |
| 3,315,394 A | 4/1967 | Kluck | |
| 4,236,746 A * | 12/1980 | LaVoie | ........................ 296/97.22 |
| 4,978,207 A * | 12/1990 | Gillner et al. | .................. 359/871 |
| D350,104 S | 8/1994 | Lee | |
| D381,307 S | 7/1997 | Gwynn et al. | |
| D418,789 S | 1/2000 | Sloan | |
| 6,167,645 B1 | 1/2001 | Gasko et al. | |
| 6,757,998 B1 | 7/2004 | Lucatorto | |
| D534,110 S | 12/2006 | Kellermann | |
| 7,243,892 B2 * | 7/2007 | Pfister | ........................... 248/371 |
| 7,290,362 B1 * | 11/2007 | Passmore | ......................... 40/591 |
| D560,470 S * | 1/2008 | Short et al. | ...................... D8/354 |
| D566,024 S | 4/2008 | Pacleb | |
| 7,401,427 B2 | 7/2008 | Zander | |
| 7,726,617 B2 * | 6/2010 | Zambelli et al. | .......... 248/288.31 |
| 7,752,785 B2 | 7/2010 | Beer et al. | |
| 7,966,757 B2 * | 6/2011 | Hyung-Chul | ................... 40/603 |
| 8,112,924 B2 * | 2/2012 | Longobardo | .............. 40/606.13 |

(Continued)

*Primary Examiner* — Casandra Davis
(74) *Attorney, Agent, or Firm* — Perkins IP Law Group LLC; Jefferson Perkins

(57) ABSTRACT

A pre-measured license plate frame spacer unit used in conjunction with a license plate frame will prevent the license plate frame from coming into contact with the vehicle mounting surface.

25 Claims, 3 Drawing Sheets

(56) References Cited

U.S. PATENT DOCUMENTS

| | | | |
|---|---|---|---|
| 2008/0034625 A1* | 2/2008 | Pacleb | 40/209 |
| 2008/0084590 A1 | 4/2008 | Mack | |
| 2012/0281426 A1* | 11/2012 | Polka et al. | 362/549 |

* cited by examiner

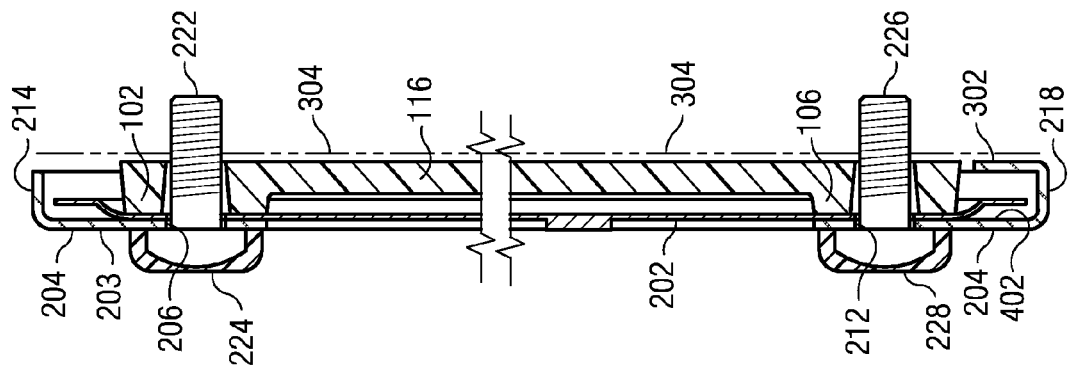
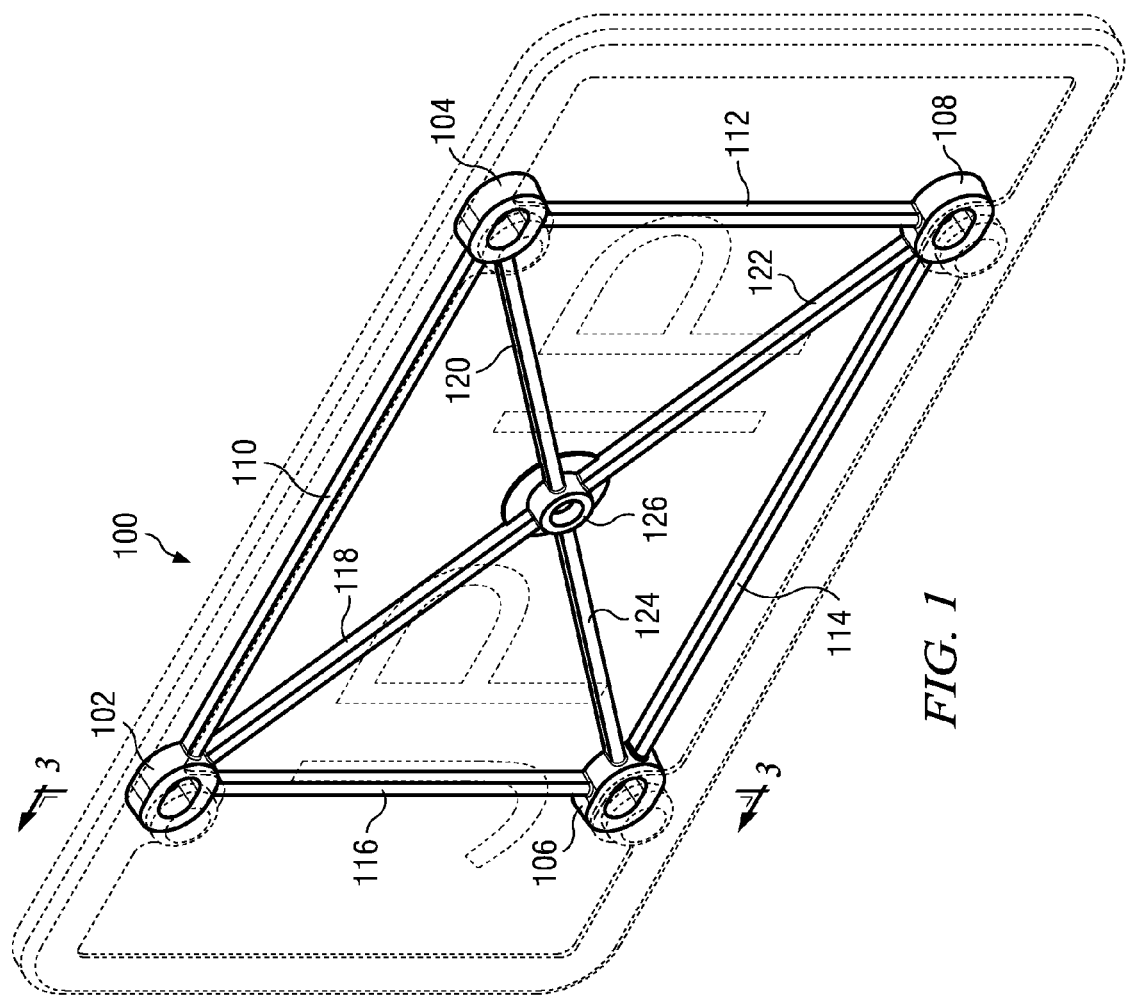

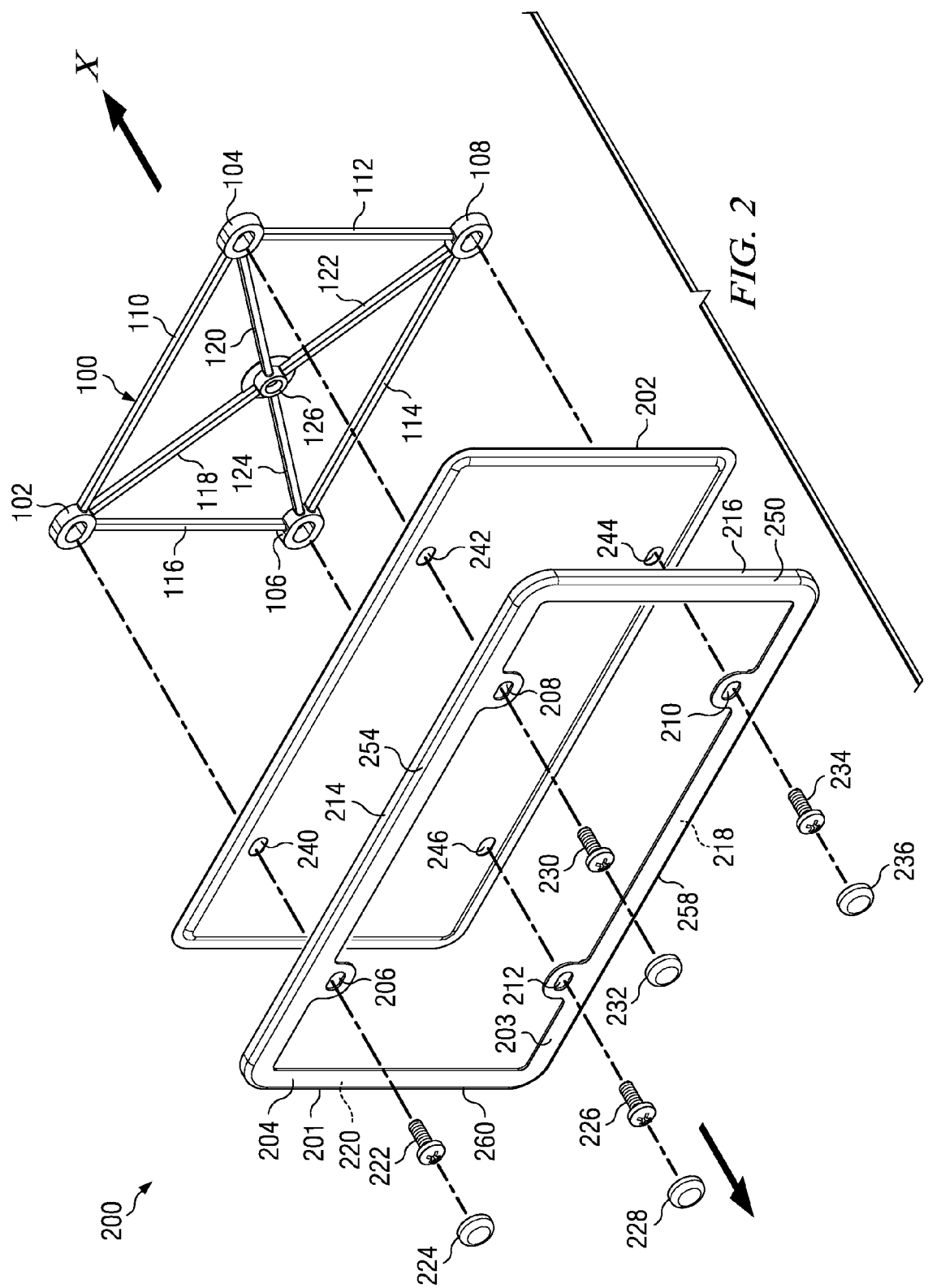

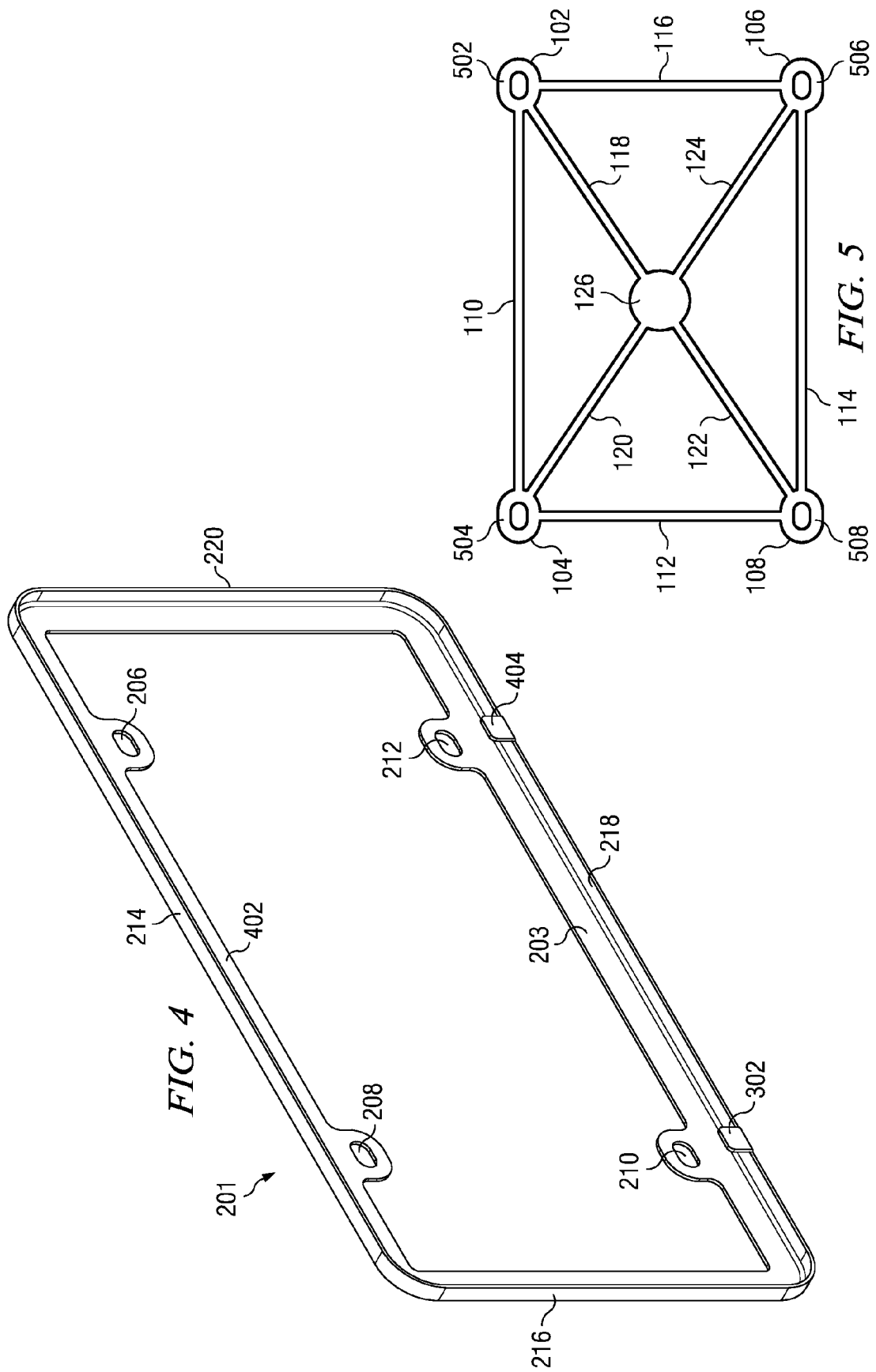

LICENSE PLATE FRAME SPACER UNIT AND SYSTEM

BACKGROUND OF THE INVENTION

Most states require drivers to install license plates on both the fronts and backs of vehicles. The license plates are installed with screws that attach the license plate to the bumper of the vehicle via pre-drilled holes. It is a further common practice to install such license plates as partially enclosed or held by a license plate frame. Some license plate frames are made of metal, as are most of the license plates themselves. While vehicle bumpers used to be formed of a metal such as chrome-plated steel, more recently bumpers have been formed of plastic or composite material with a softer surface, and typically are painted. An aluminum license plate or a metal license plate frame that is mounted directly on such a bumper is apt to mar the bumper surface. A conventional solution to this problem is to provide a set of washers or spacers, one per vehicle license plate mounting screw, for placement between the license plate or frame and the bumper. Such washers or spacers are difficult to maneuver and keep track of during installation.

Thus a need exists for a one-piece pre-measured license plate frame spacer that will not rust, which will prevent the marring or abrasion of the bumper to which the frame is attached, and which will prevent the license plate and frame from rattling and jiggling.

SUMMARY OF THE INVENTION

According to one aspect of the invention, a license plate frame spacer unit has an upper left hollow spacer, an upper right hollow spacer, a lower left hollow spacer and a lower right hollow spacer all adapted to receive a respective license plate frame mounting screw along a respective axis. The axes are substantially parallel to each other and substantially parallel to a longitudinal axis of the vehicle. There are more than one elongate connecting members with each hollow spacer terminating an elongate connecting member. Each spacer is joined to at least one other spacer by at least one elongate connecting member. The four spacers are connected together either directly or indirectly by the connecting members. Each hollow spacer has a thickness preselected to displace the license plate frame from the vehicle mounting surface.

According to another aspect of the invention, a license plate frame mounting system includes a license plate frame and a license plate frame spacer unit. The license plate frame has a central frame member with an outer face which is substantially orthogonal to a longitudinal axis of the vehicle and an inner face opposed to the outer face. The central frame member has four edges—a top edge, bottom edge, right edge and left edge. A left sidewall is integrally formed with the left edge, a right sidewall is integrally formed with the right edge, a top sidewall is integrally formed with the top edge and a bottom sidewall is integrally formed with the bottom edge. The four sidewalls extend inwardly by a predetermined depth, in a direction substantially parallel to the longitudinal axis, from the inner face of the central frame member. An upper left mounting screw socket, an upper right mounting screw socket, a lower left mounting screw socket, and a lower right mounting screw socket, are each adapted to receive a respective license plate frame mounting screw along a respective axis substantially parallel to the longitudinal axis of the vehicle. The license plate frame mounting system includes a license plate frame spacer unit as described in the preceding paragraph. The hollow spacers of the spacer unit have a preselected thickness that, combined with the thickness of the license plate, is greater than the predetermined depth of the frame sidewalls, thereby preventing the plate frame from contacting the bumper or other mounting surface of the vehicle.

The present invention provides an advantage over prior individual hollow spacers because it allows for easier installation and assembly. In addition, when used in a license plate frame mounting system, the license plate spacer insures that the license plate and frame will not rub against or otherwise abrade or mar the vehicle mounting surface.

BRIEF DESCRIPTION OF THE DRAWINGS

Further aspects of the invention and their advantages can be discerned in the following detailed description, in which like characters denote like parts and in which:

FIG. 1 is an isometric view of the license plate frame mounting system, a license plate and license plate frame being shown in dotted line;

FIG. 2 is an exploded view of the license plate frame mounting system shown in FIG. 1;

FIG. 3 is sectional view taken substantially along line 3-3 of FIG. 1;

FIG. 4 is an isometric view of the back of the license plate frame shown in FIG. 2; and FIG. 5 is a back view of the back of the license plate frame spacer unit shown in FIG. 1.

DETAILED DESCRIPTION

A license plate frame spacer unit 100 according to the invention can be used to mount a license plate and license plate frame without marring or scratching the vehicle mounting surface. In the embodiment shown in FIG. 1, the license plate frame spacer unit 100 is shown positioned under a license plate and license plate frame. The license plate frame spacer unit 100 is preferably injection molded of a thermoplastic polymer but may also be molded or otherwise formed from a rubber or other thermosetting polymer, a cellulose-based material, or other weather-resistant material that is soft enough to not mar or abrade a painted vehicle bumper surface. An upper left hollow spacer 102 is positioned and adapted to receive an upper left license plate frame mounting screw (shown in FIG. 3) along an upper left axis. An upper right hollow spacer 104 is positioned and adapted to receive an upper right license plate frame mounting screw along an upper right axis. A lower left hollow spacer 106 is positioned and adapted to receive a lower left license plate frame mounting screw along a lower left axis. A lower right hollow spacer 108 is positioned and adapted to receive a lower right license plate frame mounting screw along a lower right axis. The upper left, upper right, lower left and lower right axes, shown in FIG. 2, are substantially parallel to each other and substantially parallel to a longitudinal axis of the vehicle. In the illustrated embodiment these axes are completely parallel to each other, but in other embodiments they may be slightly canted to conform to curved frames and/or mounting surfaces. In the illustrated embodiment the hollow spacers are shown as having a transversely oval shape but they may also be circular or any other shape that fits with the license plate and license plate frame holes and accepts license plate frame mounting screws. Moreover, the spacers are illustrated with substantially uniform thicknesses although other embodiments may use spacers with varying thicknesses.

A plurality of elongate connecting members 110, 112, 114, 116, 118, 120, 122 and 124 extend between and terminate at the hollow spacers 102, 104, 106, 108. As illustrated, the elongate connecting members have a smaller thickness than the spacers, but further embodiments may have elongate connecting members with the same thickness as the spacers or a different thickness than shown. In the embodiment illustrated in FIG. 1, there are four peripheral connecting members 110, 112, 114, 116. In the illustrated embodiment, these are straight, of uniform cross-section, and are arranged as sides of a right rectangle, although members 110-116 alternatively could be sinuous or curved, and/or could have variant cross sections. As illustrated connecting member 110 extends between the upper left hollow spacer 102 and the upper right hollow spacer 104, connecting member 116 extends between the upper left hollow spacer 102 and the lower left hollow spacer 106, connecting member 112 extends between the upper right hollow spacer 104 and the lower right hollow spacer 108 and connecting member 114 extends between the lower right hollow spacer 108 and the lower left connecting member 106.

FIG. 1 also illustrates four internal connecting members 118, 120, 122 and 124. The internal connecting members radiate from a central boss 26 outwardly to the hollow spacers 102, 104, 106 and 108. In other embodiments the central boss may not be centered from each of the hollow spacers 102, 104, 106, 108 but may be in a different position. In the illustrated embodiment, connecting member 118 extends between the upper left hollow spacer 102 and the central boss 126. Connecting member 120 extends between the upper right hollow spacer 104 and the central boss 126. Connecting member 124 extends between the lower left hollow spacer 106 and the central boss 126. Connecting member 122 extends between the lower right hollow spacer 108 and the central boss 126.

In the embodiment illustrated in FIG. 1 eight connecting members 110, 112, 114, 116, 118, 120, 122, 124 are shown as well as a central boss 126. Other embodiments may have fewer connecting members as long as each spacer 102, 104, 106, 108 is joined to at least one other spacer 102, 104, 106, 108 by at least one connecting member either directly or indirectly, and that all of the spacers 102-108 are connected together as a single unit 100. An indirect attachment would occur when, for example, the upper left spacer 102 is attached to the lower left spacer 104 via a connecting member 116 and the lower left spacer 104 is connected to the lower right spacer 108 via a connecting member 114. The upper left spacer 102 and the lower right spacer 108 would be indirectly attached to each other because there is no connecting member directly attaching the two spacers. In addition, alternative embodiments may not have a central boss 126 or the central boss may be of a different shape or thickness. While in the illustrated embodiment the radiating members 118-124 are shown to be straight and of uniform cross section, they could be otherwise; for example, they could take sinuous or curved paths, and/or be of nonuniform cross section.

FIG. 2 illustrates a license plate frame mounting system 200 which includes a license plate frame 201, a license plate 202 and a license plate frame spacer unit 100. The license plate frame 201 is preferably stamped from metal but may formed in other ways and/or from other materials, such as plastic. The license plate frame has a central frame member 203 with a front face 204. The central frame member 203 has four edges, a top edge 254, a right side 250, a bottom side 258 and a left side 260. A top sidewall 214 is integrally formed with the top edge 254 of the central frame member 203. A right sidewall 216 is integrally formed with the right edge 250 of the central frame member 203. A bottom sidewall 218 is integrally formed with the right edge 258 of the central frame member 203. A left sidewall 220 is integrally formed with the right edge 260 of the central frame member 203 with each sidewall 214, 216, 218, 220, having a thickness. As illustrated, the top sidewall 214 joins the first side sidewall 216 and second side sidewall 220. The bottom sidewall 218 also joins the first side sidewall 216 and second side sidewall 220. In further embodiments the sidewalls 214, 216, 218, 220 may not join each other. The sidewalls 214, 216, 218, 220 extend inwardly, in a direction parallel with the longitudinal vehicle axis X, from the inner face 402 (see FIG. 4) of the central member 203. As illustrated the license plate frame 201 has a uniform thickness yet further embodiments may have license plate frames 201 with varying thicknesses.

An upper left mounting screw socket 206 is adapted to receive the upper left license plate mounting screw 222 along an upper left axis. An upper right mounting screw socket 208 is adapted to receive the upper right license plate mounting screw 230 along an upper right axis. A lower left mounting screw socket 212 is adapted to receive the lower left license plate mounting screw 228 along a lower left axis. A lower right mounting screw socket is adapted to receive the lower right license plate mounting screw 234 along a lower right axis. In the illustrated embodiment screw caps 224, 228, 232, 236 are snapped onto the respective license plate mounting screws 222, 226, 230, 234. Alternate embodiments may not have screw caps 224, 228, 232, 236 or may have screw caps that snap together with one piece of the screw cap on either side of the screw head.

The license plate 202 has four screw holes: an upper left screw hole 240; an upper right screw hole 242; a lower right screw hole 244; and a lower left screw hole 246. The license plate screw holes 240, 242, 244, 246 line up with the axes of the corresponding license plate frame sockets 206, 208, 210, 212 and the axes of the license plate frame spacer hollow spacers 102, 104, 106, 108. The license plate 202 is typically an aluminum stamping which will have raised letters and numbers, and may have other raised portions such as raised screw hole embossments. The license plate 202 may therefore have a thickness which is greater than the metal sheet from which it typically is stamped.

FIG. 3 illustrates a cross section of the license plate mounting system 200. Mounting screws 222, 226 join the license plate frame 201, the license plate 202 and the license plate frame spacer unit 100 to the vehicle mounting surface 304. The depth of the hollow spacers 102, 106 plus the depth of the license plate 202 should be greater than the depth of the frame sidewalls 214, 218 as measured from the central member rear surface 402. Accordingly, the license plate frame 201 does not come into contact with the vehicle mounting surface 304, preventing unwanted scratches and possible marring.

FIG. 3 illustrates a tab 302 that extends from the bottom sidewall 218, provided to retain the license plate 202 prior to mounting. Alternative embodiments may have zero, one, or multiple tabs extending from the bottom sidewall 218 (see FIG. 4). In addition, the connecting member 116 has a smaller thickness in the direction of the vehicle axis X than the hollow spacers 102, 106, while being coplanar with the hollow spacers in the plane that abuts the vehicle mounting surface. In alternative embodiments the connecting members 110, 112, 114, 116, 118, 120, 122, 124 may have a different thickness or may be the same thickness as the hollow spacers 102, 104, 106, 108. As thickened, the central boss 126 has utility in pressing the center of the license plate outward and in spacing it away from the vehicle bumper surface.

The inner surface 402 of the plate frame 201 is shown in FIG. 4. Additionally, two tabs 302, 404 are shown extending upwardly from the bottom sidewall 118.

FIG. 5 illustrates the back of the plate frame spacer unit 100. The hollow spacer 102 has a first inner spacer surface 502. Hollow spacer 104 has a second inner spacer surface 504. Hollow spacer 106 has a third inner spacer surface 506 and hollow spacer 108 has a fourth inner spacer surface. Each of the connecting members 110, 112, 114, 116, 118, 120, 122 and 124 have a respective inner surface. As illustrated the inner surfaces of the connecting members and the first, second, third and fourth inner surfaces, 502, 504, 506, 508, are substantially orthogonal to the vehicle mounting surface and are coplanar with each of the inner member surfaces.

In summary, a license plate spacer unit has been shown and described which can be used with a license plate frame to prevent the license plate frame from scratching and marring the vehicle mounting surface. While illustrated embodiments of the present invention have been described and illustrated in the appended drawings, the present invention is not limited thereto but only by the scope and spirit of the appended claims.

We claim:

1. A license plate frame spacer unit for use in mounting a license plate frame to a vehicle, the spacer unit comprising:
   an upper left hollow spacer adapted to receive an upper left license plate frame mounting screw therethrough along an upper left axis;
   an upper right hollow spacer spaced to the right of the upper left spacer and adapted to receive an upper right license plate frame mounting screw therethrough along an upper right axis;
   a lower left hollow spacer spaced below the upper left spacer and below and to the left of the upper right spacer, the lower left spacer adapted to receive a lower left license plate frame mounting screw therethrough along a lower left axis;
   a lower right hollow spacer spaced below the upper right spacer and to the right of the lower left spacer, the lower right spacer adapted to receive a lower right license plate frame mounting screw therethrough along a lower right axis;
   a plurality of elongate connecting members, each spacer terminating a connecting member, each spacer joined to at least one other of the spacers by at least one connecting member, all of the spacers connected together directly or indirectly by the connecting members;
   the upper left, upper right, lower left and lower right axes being substantially parallel to each other;
   each spacer having a thickness along its respective axis preselected to axially displace the license plate frame from the vehicle by the mounting screws;
   wherein the plurality of connecting members include ones radiating from a center point, the center point being spaced from the each of the spacers by an approximately equal distance; and
   wherein a central boss is located at approximately the center point.

2. The license plate frame spacer unit of claim 1, wherein the plurality of connecting members include at least one vertically disposed connecting member.

3. The license plate frame spacer unit of claim 1, wherein the plurality of connecting members include at least one horizontally disposed connecting member.

4. The license plate frame spacer unit of claim 1, wherein the spacer is injection molded of plastic.

5. The license plate frame spacer unit of claim 1, wherein the thickness of each spacer is substantially uniform.

6. The license plate frame spacer unit of claim 1, wherein each of the hollow spacers are endless.

7. The license plate frame spacer unit of claim 6, wherein each of the hollow spacers has a noncircular hole.

8. The license plate frame spacer unit of claim 1, wherein a position of each of the spacers is positioned to line up to a respective license plate mounting hole.

9. The license plate frame spacer unit of claim 1, wherein the upper left hollow spacer has a first inner spacer surface, the upper right hollow spacer has a second inner spacer surface, the lower left hollow spacer has a third inner spacer surface, the lower right hollow spacer has a fourth inner spacer surface, each of the plurality of connecting members has a respective inner member surface, said inner surfaces being disposed substantially orthogonally to the vehicle axis, the first, second, third and fourth inner spacer surfaces being coplanar with each of the plurality of inner member surfaces.

10. A license plate frame spacer unit for use in mounting a license plate frame to a vehicle, the spacer unit comprising:
    an upper left hollow spacer adapted to receive an upper left license plate frame mounting screw therethrough along an upper left axis;
    an upper right hollow spacer spaced to the right of the upper left spacer and adapted to receive an upper right license plate frame mounting screw therethrough along an upper right axis;
    a lower left hollow spacer spaced below the upper left spacer and below and to the left of the upper right spacer, the lower left spacer adapted to receive a lower left license plate frame mounting screw therethrough along a lower left axis;
    a lower right hollow spacer spaced below the upper right spacer and to the right of the lower left spacer, the lower right spacer adapted to receive a lower right license plate frame mounting screw therethrough along a lower right axis;
    a plurality of elongate connecting members, each spacer terminating a connecting member, each spacer joined to at least one other of the spacers by at least one connecting member, all of the spacers connected together directly or indirectly by the connecting members;
    the upper left, upper right, lower left and lower right axes being substantially parallel to each other; and
    each spacer having a thickness along its respective axis preselected to axially displace the license plate frame from the vehicle by the mounting screws;
    wherein each of the plurality of connecting members has a thickness, the connecting member thickness being less than that of the spacers as measured along the respective spacer axis.

11. The license plate frame spacer unit of claim 10, wherein the plurality of connecting members include at least one vertically disposed connecting member.

12. The license plate frame spacer unit of claim 10, wherein the plurality of connecting members include at least one horizontally disposed connecting member.

13. The license plate frame spacer unit of claim 10, wherein the spacer is injection molded of plastic.

14. The license plate frame spacer unit of claim 10, wherein the thickness of each spacer is substantially uniform.

15. The license plate frame spacer unit of claim 10, wherein each of the hollow spacers are endless.

16. The license plate frame spacer unit of claim 15, wherein each of the hollow spacers has a noncircular hole.

17. The license plate frame spacer unit of claim 10, wherein a position of each of the spacers is positioned to line up to a respective license plate mounting hole.

18. The license plate frame spacer unit of claim 10, wherein the upper left hollow spacer has a first inner spacer surface, the upper right hollow spacer has a second inner spacer surface, the lower left hollow spacer has a third inner spacer surface, the lower right hollow spacer has a fourth inner spacer surface, each of the plurality of connecting members has a respective inner member surface, said inner surfaces being disposed substantially orthogonally to the vehicle axis, the first, second, third and fourth inner spacer surfaces being coplanar with each of the plurality of inner member surfaces.

19. A license plate mounting system for mounting a license plate to a vehicle, the system comprising:
  a license plate frame having a central frame member with an outer face disposed to be substantially orthogonal with a longitudinal axis and an inner face opposed to the outer face, the central frame member having top, right, left and bottom edges, a top sidewall of the frame integrally formed with the top edge of the central frame member, a left sidewall of the frame integrally formed with the left edge of the central frame member, a right sidewall of the frame integrally formed with the right edge of the central frame member, a bottom sidewall of the frame integrally formed with the bottom edge of the central frame member, the sidewalls of the frame extending inwardly from the inner face of the central frame member in a direction substantially parallel to the longitudinal axis by a predetermined depth;
  an upper left mounting screw socket of the central frame member adapted to receive an upper left license plate frame mounting screw therethrough along an upper left axis;
  an upper right mounting screw socket of the central frame member spaced to the right of the upper left mounting screw socket and adapted to receive an upper right license plate frame mounting screw therethrough along an upper right axis;
  a lower left mounting screw socket of the central frame member spaced below the upper left mounting screw socket and below and to the left of the upper right mounting screw socket, the lower left mounting screw socket adapted to receive a lower left license plate frame mounting screw therethrough along a lower left axis;
  a lower right mounting screw socket of the central frame member spaced below the upper right mounting screw socket and below and to the right of the upper left mounting screw socket, the lower right mounting screw socket adapted to receive a lower left license plate frame mounting screw therethrough along a lower right axis, the upper left, upper right, lower left and lower right axes being substantially parallel to the longitudinal axis;
  each sidewall having a sidewall thickness along its respective axis; and
  a license plate frame spacer unit, including
    an upper left hollow spacer adapted to receive an upper left license plate frame mounting screw therethrough along the upper left axis;
    an upper right hollow spacer spaced to the right of the upper left spacer and adapted to receive the upper right license plate frame mounting screw therethrough along the upper right axis;
    a lower left hollow spacer spaced below the upper left spacer and below and to the left of the upper right spacer, the lower left spacer adapted to receive a lower left license plate frame mounting screw therethrough along the lower left axis;
    a lower right hollow spacer spaced below the upper right spacer and to the right of the lower left spacer, the lower right spacer adapted to receive a lower right license plate frame mounting screw therethrough along the lower right axis;
    a plurality of elongate connecting members of the spacer unit, each spacer of the spacer unit terminating a connecting member, each spacer joined to at least one other of the spacers by at least one connecting member, all of the spacers connected together directly or indirectly by the connecting members;
    each spacer of the spacer unit having a preselected thickness along its respective axis such that the spacer thickness combined with a predetermined thickness of a license plate is greater than the predetermined depth of the frame sidewalls, thereby preventing the plate frame from contacting a mounting surface of the vehicle.

20. The license plate mounting system of claim 19, wherein the upper right, upper left, lower right, and lower left sockets are laterally and vertically inwardly spaced from the inner surfaces of the sidewalls, such that each of the sockets align with the respective axis and the spacer unit will fit inside the frame.

21. The license plate mounting system of claim 19, wherein the license plate frame has a uniform thickness.

22. The license plate mounting system of claim 21, wherein the license plate frame is stamped from metal.

23. The license plate mounting system of claim 19, wherein at least one upwardly extending tab on the bottom sidewall extends upwardly from the inner edge of the bottom sidewall such that the license plate is received between the central frame member and the at least one tab.

24. The license plate mounting system of claim 19, wherein the top sidewall is joined to the left sidewall and the right sidewall and the left and right sidewalls are joined to the bottom sidewall.

25. The license plate mounting system of claim 19, wherein the central boss has said preselected thickness.

* * * * *